March 2, 1954
E. LEES ET AL
2,671,155
RESISTANCE WELDING APPARATUS
Filed Dec. 22, 1950
2 Sheets-Sheet 1
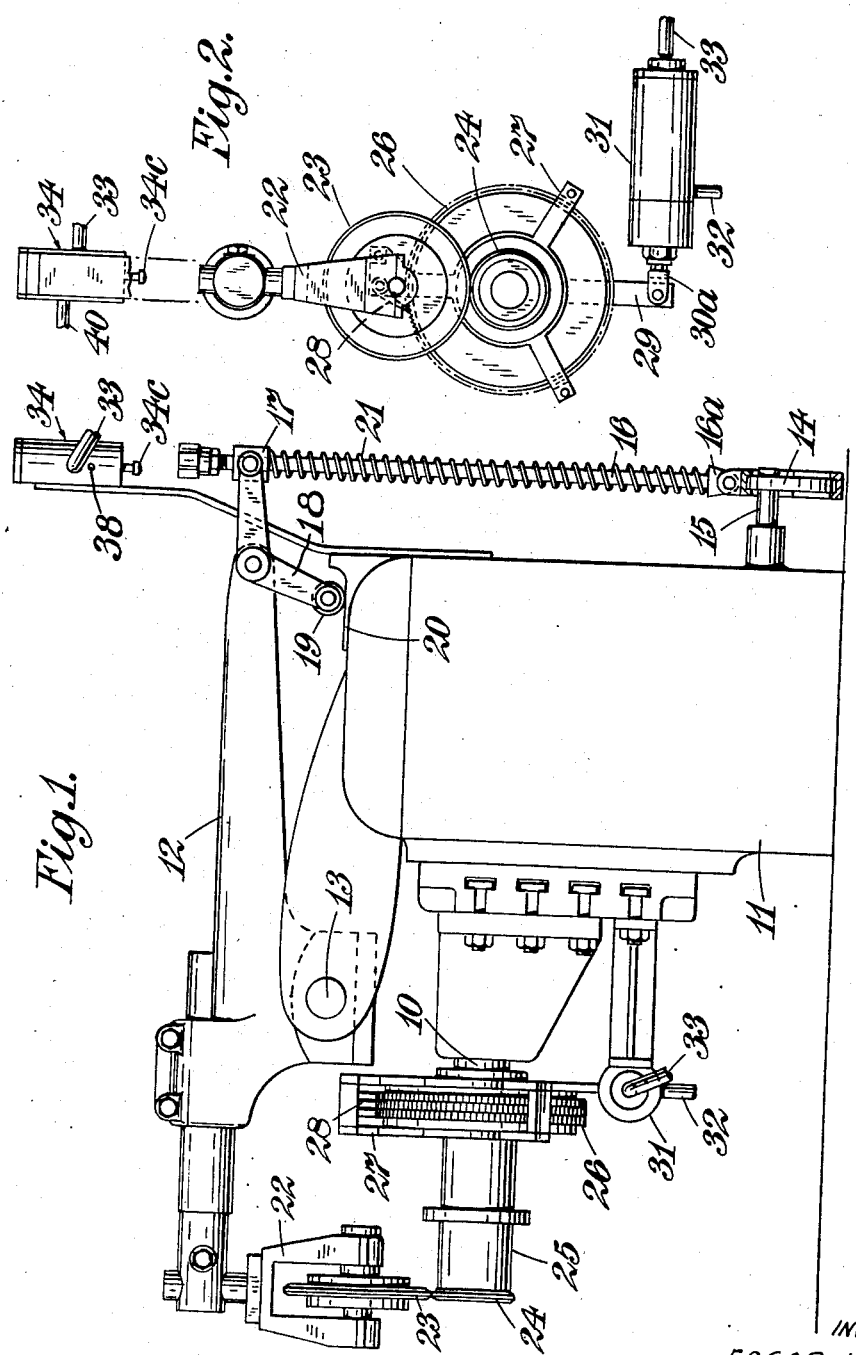
INVENTORS
EDGAR LEES &
FRANK A. COOKE
by Wilkinson Mawhinney
Attys.

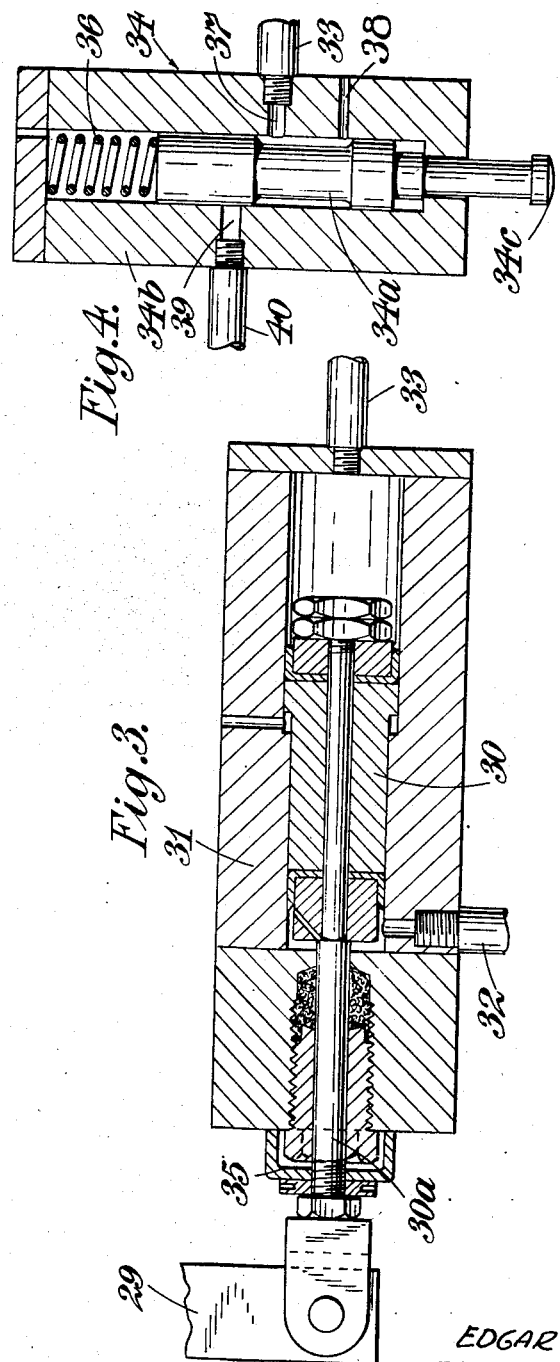

Patented Mar. 2, 1954

2,671,155

UNITED STATES PATENT OFFICE 2,671,155

RESISTANCE WELDING APPARATUS

Edgar Lees and Frank Arthur Cooke, Loughborough, England, assignors to Rolls-Royce Limited, Derby, England, a British company Application December 22, 1950, Serial No. 202,293

Claims priority, application Great Britain January 9, 1950

5 Claims. (Cl. 219—4)

This invention relates to electrical resistance welding apparatus and is concerned more particularly with apparatus for stitch welding.

The invention has for an object to provide an improved stitch welding apparatus in which the spacing of the welds is controlled automatically.

According to this invention, a stitch welding apparatus comprises co-operating electrodes formed as rotatable wheel elements, means to apply welding pressure between the electrodes, and an indexing mechanism arranged to effect a step-by-step rotation of at least one of the electrodes, the rotation of the electrode being effected in alternation with the application of welding pressure.

According to a feature of this invention, the stitch welding apparatus may comprise a pivoted arm arranged to carry one electrode, said pivoted arm being rockable to move the electrodes towards and away from one another by said means to apply welding pressure, a fixed arm, a sleeve rotatable on said fixed arm and carrying the other of said electrodes, said sleeve being arranged to be rotated by said indexing mechanism to effect the step-by-step rotation of said other of the electrodes.

According to yet another feature of this invention, the indexing may comprise a ratchet wheel rotatable with said sleeve, and a pawl co-operating with said ratchet wheel, the pawl being arranged for reciprocation to effect rotation of the ratchet wheel in tuned relation to the rocking of the pivoted arm and may also comprise a spider carrying the pawl, said spider being freely mounted on the fixed arm, and a piston and cylinder device, the effective areas of the sides of the piston being different, a source of pressure fluid, a first pressure connection leading from said source direct to the smaller area side of said piston, a second pressure connection leading from said source to the larger area side of said piston, a valve in said second pressure connection said valve being operable to admit pressure fluid to and cut-off pressure fluid from said larger area side of the piston under control of the means to apply welding pressure.

According to a further feature of this invention, the means to apply welding pressure may comprise a spring, an abutment for the spring, a rotatable eccentric to displace the abutment, said spring being arranged to load the pivoted lever, and a tappet arranged for reciprocation by the eccentric to operate said valve. The pressure fluid is thus admitted to the larger area end of the piston in timed relation with the rocking of the pivoted arm and the pawl mechanism is therefore operated in timed relation with the application of welding pressure.

One construction of stitch welding apparatus according to this invention will now be described by way of example, the description referring to the accompanying drawings in which:

Figure 1 is a side elevation of the welding apparatus,

Figure 2 is a diagrammatic front elevation of the apparatus, and

Figures 3 and 4 are detail views.

The stitch welding apparatus comprises a fixed arm 10 extending horizontally outwards from the body 11 of the machine and a second arm 12 pivoted at 13 on the body of the machine. The pivoted arm 12 is mounted vertically above the fixed arm 20 so as also to extend substantially parallel thereto and the pivoted arm 12 rocks about a horizontal axis so that the front end of the arm 12 moves towards and away from the fixed arm 10.

The machine comprises a motor housed within the body 11 and driving through shaft 15 an eccentric 14 arranged to reciprocate a rod 16 slidable through a hollow bush 17 pivoted at the end of one arm of a bell-crank 18. The bell-crank 18 is pivoted on the rear end of the pivoted arm 12 and the second arm of the bell-crank carries a roller 19 running on a bearing plate 20. A compression spring 21 is carried on the rod 16 to have one abutment against a shoulder 16a on the rod and a second abutment against the bush 17.

At its front end, the pivoted arm 12 carries a fork 22 in which one welding electrode 23 is rotatably mounted, the electrode being in the form of a wheel.

The second welding electrode 24 which is also in the form of a wheel, is secured on a sleeve 25 rotatably mounted on the fixed arm 10 and the arrangement is such that the two wheel electrodes 23, 24 rotate about parallel axes. The sleeve 25 also carries a ratchet wheel 26 having a number, say, three, rows of ratchet teeth, the teeth in each row being staggered in relation to the teeth in the other rows.

Freely mounted to rock on the sleeve 25 is a spider member 27 carrying pawls 28 to engage with the teeth of the ratchet wheel 26. An arm 29 extending from the spider 27 is connected to the piston rod 30a of a stepped piston 30 (Figures 2 and 3) working in a cylinder 31 mounted on the machine. The piston 30 is arranged in the cylinder 31 so that its end of small area is adjacent the spider arm 29 to which the piston is connected. The end of the cylinder 31 opening to the smaller area end of the piston 30 is connected by pipeline 32 directly to a pressure air supply and the other end of the cylinder 31 is connected by pipeline 33 to the same pressure supply through a valve mechanism 34 (Figures 1, 2 and 4) which is actuated so that the indexing mechanism formed by ratchet wheel 26 and pawls 28 and thus the electrode 24 are operated in timed relation to the application of welding pressure between the electrodes 23, 24. A recessed nut 35 abuts the end of the cylinder to limit travel of the piston 30 to the right as viewed in Figure 3, and the travel to the left is limited by the smaller end of the piston abutting the end of the cylinder space. The stroke of the piston is adjustable by adjustment of the nut 35 and the piston 30 on the piston rod 30a. Adjustment of the piston 30 on the piston rod 30a may be effected by inserting shims between the left hand end of the piston 30 (as seen in the drawing) and the shoulder on the rod 30a.

The valve mechanism 34 comprises a piston valve element 34a working in a cylinder 34b which is mounted on the machine body 11 vertically above the rod 16 which is reciprocated by the eccentric 14 to rock the pivoted arm 12. The piston valve element 34a is loaded by a spring 36 into a position in which port 37 opening to the pipeline 33 from the differential piston cylinder 31 is open to an exhaust port 38. A third port 39 is formed in the piston valve cylinder 34b opening to a pressure air supply line 40, and in its normal position (Figure 4) the piston valve 34a cuts off communication between the pressure air supply inlet port 39 and the port 37 leading to the pipeline 33. The stem of the piston valve element 34a is formed as a tappet 34c projecting through the lower end of the cylinder.

The operation of the machine is as follows. On turning on the air supply, the differential piston 30 is loaded at its smaller area end and the piston is thereby displaced to the right (Figure 3) rocking the spider 27 about the sleeve 25 and causing the pawls 28 to advance the ratchet wheel 26 and at the same time to rotate the wheel electrode 24 carried on the sleeve 25.

On starting the motor to rotate the eccentric 14, the eccentric-driven rod 16 moves upwardly to rock the pivoted arm 12 and advances the wheel electrode 23 towards the wheel electrode 24 carried on the sleeve 25, and to cause the spring 21 surrounding the eccentric-driven rod to be compressed to apply the proper welding pressure between the electrodes 23, 24.

Towards the end of its upwards travel, the upper end of the eccentric-driven rod 16 bears against the tappet 34c formed by the stem of the piston valve 34a and thereby displaces the piston valve 34a upwardly within the cylinder 34b against the spring 36 to place the pressure air supply port 39 in communication with the port 33 and to permit pressure air to be supplied to the larger end of the differential piston 30. The load acting on the larger area end of the piston therefore increases and overcomes that on the smaller area end thereby displacing the piston 30 and rocking the spider 27 in an opposite direction to cause the pawls 28 to ride back over a ratchet tooth.

When during its return movement the upper end of the eccentric-driven rod 16 moves out from contact with the tappet 34c of the piston valve 34a, the piston valve is urged by its spring 36 back into the position in which the port 37 is connected to exhaust port 38 so that the load due to the air pressure acting on the smaller area end of the piston 30 becomes greater than that on the larger end and causes the ratchet wheel 26 and the wheel electrode 24 carried on the sleeve 25 to be moved by a distance equivalent to the pitch of the ratchet teeth.

It will thus be seen that the electrode 24 carried by the sleeve 25 mounted on the fixed arm 10 of the welding apparatus is rotated in steps, carrying the work between the electrodes 23, 24 with it, rotation of the wheel electrode 24 being effected on the release of the full welding pressure.

The diameter of the ratchet wheel 26 is preferably considerably greater than that of the wheel electrode 24 carried on the sleeve 25 and the wheel electrode 24 can have a different diameter from the electrode 23.

The stitch welding apparatus of this invention has the advantage that the weld pitch can be adjusted by altering the length of the stroke of the differential piston and by varying the number of pawls in operation. The pitch of the weld can also be adjusted by varying the size of the wheel electrode 24 carried by the sleeve 25.

The apparatus of the invention ensures that the pitch of the welds is uniform and also has the advantages that the electrodes have a longer life thus reducing the cost of re-trimming, that the apparatus requires less skill to operate and that where for example slots occur in the work to be welded it is not necessary to weld over them, it being merely necessary to switch off the welding current.

We claim:

1. Stitch welding apparatus comprising a pair of welding electrodes formed as rotatable wheel elements, a fixed arm, a sleeve rotatable on said fixed arm and having secured to it one electrode, a ratchet wheel rotatable with said sleeve, a pawl co-operating with said ratchet wheel and arranged to reciprocate to effect step-by-step rotation of the ratchet wheel, a spider carrying said pawl and freely mounted on said fixed arm, a piston and cylinder device, the effective areas of the sides of the piston being different, a source of pressure fluid, a first pressure connection leading from said source direct to the smaller area side of said piston, a second pressure connection leading from said source to the larger area side of said piston, a valve in said second pressure connection said valve being operable to admit pressure fluid to and cut-off pressure fluid from said larger area side of the piston, said piston and cylinder device being connected to the spider to rock it about the fixed arm and thereby to reciprocate the pawl, a pivoted arm carrying the other of the electrodes and rockable to move the electrodes towards and away from one another, a spring, a first abutment for the spring, a rotatable eccentric to displace said first abutment alternately in opposite directions, a second abutment for said spring carried by said pivoted arm whereby said pivoted arm is rocked by reciprocation of said first abutment and a tappet arranged for reciprocation with said first abutment and arranged to engage and operate said valve.

2. Stitch welding apparatus comprising cooperating welding electrodes formed as rotatable wheel elements; automatic means alternately to apply and relieve welding pressure between the electrodes; an indexing mechanism arranged to effect a step-by-step rotation of one electrode comprising a pawl-and-ratchet device whereof the ratchet is connected to said one electrode to rotate therewith, a piston-and-cylinder device connected to said pawl to rotate it; and automatic control means to cause said electrode to be indexed in timed relation with the application of welding pressure comprising a source of pressure fluid, a connection from said source to said piston-and-cylinder device so adapted and arranged that when said source is connected to said piston-and-cylinder device the pawl is loaded to engage said ratchet and to rotate it, valve means in said connection, means continuously to urge said pawl in the direction to ride back over the ratchet teeth, and means to open said valve during the application of welding pressure between the electrodes and to close it while the welding pressure is being relieved, whereby said pawl is urged in the direction to index the electrode during the application of the welding pressure.

3. Stitch welding apparatus comprising co-operating welding electrodes formed as rotatable wheel elements, means to apply welding pressure between said electrodes, a fixed arm to carry one of said electrodes, a pivoted arm arranged to carry the other of said electrodes, said pivoted arm being rockable by said means to apply welding pressure to move the electrodes towards and away from one another, and a sleeve rotatable on said fixed arm and having said one electrode secured thereto; an indexing mechanism arranged to effect step-by-step rotation of said sleeve, which indexing mechanism comprises a ratchet wheel secured to said sleeve, a pawl co-operating with said ratchet wheel, a spider carrying said pawl and being mounted for angular reciprocation relative to said sleeve and to said fixed arm thereby to reciprocate said pawl, a piston and cylinder device whereof the piston has its ends of different effective areas, a source of pressure fluid, a first pressure connection leading from said source direct to said piston and cylinder device to load the smaller area end of said piston, a second pressure connection leading from said source to said piston and cylinder device to load the larger area end of said piston, and a valve in said second pressure connection to control loading of said larger area end of said piston; and control means arranged to control said means to apply welding pressure between said electrodes and also to control said valve alternately to admit pressure fluid to and cut off pressure fluid from said larger area end of said piston.

4. Stitch welding apparatus comprising co-operating welding electrodes formed as rotatable wheel elements, a pivoted arm arranged to carry one electrode, said pivoted arm being rockable to move the electrodes towards and away from one another, a fixed arm to support the other electrode, a sleeve rotatable on said fixed arm and having said other electrode secured thereto, a ratchet wheel rotatable with said sleeve, a spider freely mounted on said fixed arm, a pawl co-operating with said ratchet wheel and carried by said spider, a piston and cylinder device whereof the piston has end surfaces of different effective areas, a source of pressure fluid, a first pressure connection leading from said source direct to said piston and cylinder device to load the smaller area end of the piston, a second pressure connection leading from said source to said piston and cylinder device to load the larger area end of said piston, and a valve in said second pressure connection and operable to admit pressure fluid to and cut off pressure fluid from said larger area side of the piston.

5. Stitch welding apparatus comprising co-operating welding electrodes, each formed as a rotatable wheel element, a fixed arm to carry one of said electrodes, a movable arm having the other of said electrodes carried thereon and being movable to relatively move the electrodes towards and away from one another, a sleeve rotatable on said fixed arm and having said one electrode secured thereto, a ratchet wheel rotatable with said sleeve, a pawl co-operating with said ratchet wheel, means for reciprocating the pawl to effect rotation of the ratchet wheel and sleeve and thereby to effect a step-by-step rotation of the electrodes, and means to load the movable arm to apply welding pressure between the electrodes in alternation with the reciprocation of the pawl to effect the step-by-step rotation of the electrodes.

EDGAR LEES.
FRANK ARTHUR COOKE.

References Cited in the file of this patent

UNITED STATES PATENTS

| Number | Name | Date |
|---|---|---|
| 1,276,030 | Cary | Aug. 20, 1918 |
| 1,640,244 | McBerty | Aug. 23, 1927 |
| 2,173,368 | Martin | Sept. 19, 1938 |
| 2,209,932 | Rietsch | July 30, 1940 |
| 2,337,037 | Fentress | Dec. 21, 1943 |

FOREIGN PATENTS

| Number | Country | Date |
|---|---|---|
| 31,530 | Great Britain | Dec. 31, 1931 |